US010476685B2

(12) United States Patent
Hillaert et al.

(10) Patent No.: US 10,476,685 B2
(45) Date of Patent: Nov. 12, 2019

(54) PROVISIONING OF NEW BROADBAND COMMUNICATION SERVICES USING REVERSE POWER FEEDING

(71) Applicant: Alcatel Lucent, Nozay (FR)

(72) Inventors: Bart Hillaert, Putte (BE); Wim Troch, Antwerp (BE)

(73) Assignee: Alcatel Lucent, Boulogne Billancourt (FR)

( * ) Notice: Subject to any disclaimer, the term of this patent is extended or adjusted under 35 U.S.C. 154(b) by 38 days.

(21) Appl. No.: 15/571,354

(22) PCT Filed: May 23, 2016

(86) PCT No.: PCT/EP2016/061539
§ 371 (c)(1),
(2) Date: Nov. 2, 2017

(87) PCT Pub. No.: WO2016/188941
PCT Pub. Date: Dec. 1, 2016

(65) Prior Publication Data
US 2019/0132139 A1    May 2, 2019

(30) Foreign Application Priority Data
May 26, 2015  (EP) ................................. 15305792

(51) Int. Cl.
*H04L 12/10*       (2006.01)
*H04L 12/28*       (2006.01)
(Continued)

(52) U.S. Cl.
CPC .......... *H04L 12/10* (2013.01); *H04L 12/2856* (2013.01); *H04L 12/40039* (2013.01);
(Continued)

(58) Field of Classification Search
CPC ................. H04L 12/10; H04L 12/2856; H04L 12/40039; H04L 12/2878; H04L 25/026;
(Continued)

(56) References Cited

U.S. PATENT DOCUMENTS 6,847,718 B1 *  1/2005  Hiraoka ................... H04L 12/10
                                                    379/413
8,028,175 B2 *  9/2011  Diab ........................ G06F 1/30
                                                    713/300
(Continued)

FOREIGN PATENT DOCUMENTS

EP     2835934 A1    2/2015
EP     2843926 A1    3/2015
(Continued)

OTHER PUBLICATIONS

International Search Report PCT/ISA/210 for International Application No. PCT/EP2016/061539 dated Jul. 20, 2016.
(Continued)

*Primary Examiner* — Warner Wong
(74) *Attorney, Agent, or Firm* — Harness, Dickey & Pierce, P.L.C.

(57) ABSTRACT

In one embodiment, the method includes inserting an access node along a subscriber loop, the access node including a bypass switch for initially connecting a terminal segment of the subscriber loop to a network segment of the subscriber loop; operating a legacy communication service over the subscriber loop; and connecting a PSE for reverse power feeding of the access node and a new subscriber device for operating the new broadband communication service to the terminal segment. The method further includes, by the PSE, transmitting a sequence of successive command signals over the terminal segment prior to the insertion of the power feeding signal; by the access node, accumulating an electrical charge from the command signals; by the access node
(Continued)

and by means of the so accumulated electrical charge, detecting a valid command signal in the sequence of successive command signals, and thereupon configuring the bypass switch for connecting the terminal segment to a transceiver and to a PSU; by the PSE, injecting the power feeding signal over the terminal segment for reverse power feeding of the access node; and operating the new broadband communication service over the terminal segment.

13 Claims, 8 Drawing Sheets

(51) Int. Cl.
    *H04L 12/931*     (2013.01)
    *H04L 12/24*     (2006.01)
    *H04L 25/02*     (2006.01)
    *H04L 12/40*     (2006.01)

(52) U.S. Cl.
    CPC ............ *H04L 25/026* (2013.01); *H04L 41/32* (2013.01); *H04L 49/40* (2013.01); *H04L 49/405* (2013.01)

(58) Field of Classification Search
    CPC ..... H04L 27/0002; H04L 52/04; H04L 49/40; H04L 49/405; H04L 2012/6478; H04L 41/32
    See application file for complete search history.

(56) References Cited

U.S. PATENT DOCUMENTS

| | | | | |
|---|---|---|---|---|
| 8,601,289 B1* | 12/2013 | Smith | ...................... | H04L 12/10 713/300 |
| 8,818,192 B1* | 8/2014 | Smith | .................. | H04B 10/808 398/171 |
| 8,963,367 B2* | 2/2015 | Melamed | ................ | H04L 12/10 307/18 |
| 9,380,152 B2* | 6/2016 | Joffe | .................... | H04M 3/2209 |
| 9,571,669 B2* | 2/2017 | Peker | ...................... | H04L 12/10 |
| 9,893,763 B2* | 2/2018 | Peker | ........................ | H04B 3/44 |
| 2004/0268160 A1* | 12/2004 | Atkinson | .............. | H01R 27/02 713/300 |
| 2006/0159116 A1* | 7/2006 | Gerszberg | ........... | H04L 12/2856 370/431 |
| 2009/0103429 A1 | 4/2009 | Herrera Van Der Nood | | |
| 2011/0064212 A1* | 3/2011 | Cooper | ................. | H04M 19/08 379/307 |
| 2015/0304508 A1* | 10/2015 | Peker | .................. | H04M 19/003 379/24 |
| 2015/0358485 A1* | 12/2015 | Cheng | ..................... | H04L 12/10 379/32.04 |
| 2016/0173206 A1 | 6/2016 | Van Der Berg et al. | | |
| 2016/0191718 A1 | 6/2016 | Hillaert | | |
| 2016/0330334 A1* | 11/2016 | Cooper | ................. | H04M 19/08 |
| 2016/0353183 A1* | 12/2016 | Warren | ................ | H04M 11/062 |
| 2018/0131451 A1* | 5/2018 | Marchetti | ............ | H04B 10/808 |

FOREIGN PATENT DOCUMENTS

| | | | | |
|---|---|---|---|---|
| EP | 3089438 A1 * | 11/2016 | ............ | H04M 19/08 |
| JP | 2016-526825 A | 9/2016 | | |
| WO | WO-2015/011431 A1 | 1/2015 | | |

OTHER PUBLICATIONS

Written Opinion of the International Searching Authority PCT/ISA/237 for International Application No. PCT/EP2016/061539 dated Jul. 20, 2016.
Korean Office Action dated Feb. 18, 2019 for KR Patent Application No. 10-2017-7037279.
Korean Office Action dated Feb. 18, 2019 in Korean Application No. 10-2017-7037279, with a partial English translation.
Korean Office Action dated Aug. 6, 2019 in Korean Application No. 10-2017-7037279.
English translation of Mexican Office Action dated Aug. 14, 2019 in Mexican Application No. MX/A/2017/014649.

* cited by examiner

PROVISIONING OF NEW BROADBAND COMMUNICATION SERVICES USING REVERSE POWER FEEDING

CROSS-REFERENCE TO RELATED APPLICATIONS

This application is a national phase under 35 U.S.C. § 371 of PCT International Application No. PCT/EP2016/061539 which has an International filing date of May 23, 2016, which claims priority to European Application No. 15305792.2, filed May 26, 2015, the entire contents of each of which are hereby incorporated by reference.

TECHNICAL FIELD OF THE INVENTION

The present invention relates to provisioning of new broadband communication services over copper plants.

TECHNICAL BACKGROUND OF THE INVENTION

Distribution Point Units (DPU) serving subscribers with new copper access technologies for broadband communication services (e.g., G.fast) are typically deployed at a maximal distance of a few hundreds meters from the subscriber premises (e.g., 200 m for G.fast) in order to achieve the expected high data rates (e.g., 1 Gbps as aggregated data rates for G.fast). This means that the DPU will be located closer to the subscriber premises compared to current deployments. A local power supply to power the DPU is not always available at the DPU location. Therefore operators are requesting methods to feed the DPU via Reverse Power Feeding (RPF).

A Power Sourcing Equipment (PSE) installed at the subscriber premises provides a DC current to power the DPU via the same copper pair as used for broadband communication. The PSE is powered by the AC mains of the household. A Power Supply Unit (PSU) inside the DPU converts the DC voltage supplied by the PSE, typically 57V minus the DC voltage drop caused by the DC resistance along the copper pair, to a number of lower DC voltages used inside the DPU (e.g., 12V, 5V, 3V3, etc).

It is expected that operators will gradually upgrade their subscribers from a legacy communication service to the new broadband communication service provided by the DPU. These legacy communication services typically refer to the various Digital Subscriber Line flavors (xDSL), with or without the presence of Plain Old Telephone System (POTS). The legacy communication services are typically deployed from a central Office (CO) cabinet, so are for instance the ADSL or ADSL2+ communication services, from a Remote Unit (RU), so are for instance the VDSL2 communication services, or from a Local Exchange (LEX), so are for instance the POTS communication services.

At a given time, a particular subscriber is upgraded from the legacy communication service deployed from the legacy network equipment over the (long) legacy copper pair to the new broadband communication service deployed from the DPU over the (short) terminal segment of the copper pair.

To this end, a bypass switch is provisioned within the DPU. The bypass switch typically consists of a persistent relay with two switching states, namely:

the bypass state wherein the end user is transparently connected through the DPU to the legacy network equipment via the (long) legacy copper pair for support of the legacy communication service; or the termination state wherein the (short) terminal segment of the copper pair (i.e., the segment spanning from the DPU down to the subscriber premises) is connected to a transceiver of the DPU for operation of the new broadband communication service, while the network segment of the copper pair (i.e., the segment spanning from the DPU up to the legacy network equipment) is disconnected and open-circuited at the DPU side.

At the given time, the bypass relay shall thus be switched from the bypass state to the termination state for that particular subscriber. Preferably, this is accomplished without any human interaction (zero-touch installation).

Yet, there are a number of technical hurdles to overcome during the service upgrade.

Initially, when the very first user switches from a legacy communication service to the new broadband communication service, the DPU is unpowered since that user is also the very first user to feed the DPU. Hence, there is no power available at the DPU to switch the bypass relay either.

Furthermore, when a POTS service is present on the copper pair, no DC feed can be inserted on the copper pair by the PSE as this would conflict with the DC power source from the LEX (typically 48V, 53V or 60V). Although the DPU can directly get power from the latter, the DPU can only drain a little current during the ONHOOK state (typically from a few hundreds A up to a few mA) so as not to trigger an ONHOOK→OFFHOOK state transition and the insertion of the dial tone at the LEX, yielding a too long time to accumulate sufficient energy to switch the bypass relay and power its control logic.

If there is no POTS service delivered to the user, there is no DC voltage present on the copper pair either, and the PSE can start delivering DC power at once for the DPU to switch the bypass relay. However, some basic initialization protocol is still needed for the DPU to distinguish between DC power from the LEX with very little power available and DC power from the PSE with plenty of power available.

SUMMARY OF THE INVENTION

It is an object of the present invention to flawlessly provision new broadband communication services over copper plants with minimal/no human interaction while overcoming the aforementioned issues.

In accordance with a first aspect of the invention, a method for provisioning a new broadband communication service comprises inserting an access node adapted to operate the new broadband communication service along a subscriber loop; configuring a switch of the access node in a first initial switching state wherein a first pair of terminals coupled to a legacy subscriber device via a terminal segment of the subscriber loop is connected to a second pair of terminals coupled to a legacy network equipment via a further segment of the subscriber loop; operating at least one legacy communication service over the subscriber loop while the switch is in the first switching state; connecting a power sourcing equipment adapted to inject a power feeding signal for reverse power feeding of the access node and a new subscriber device adapted to operate the new broadband communication service to the terminal segment of the subscriber loop. The method further comprises, by the power sourcing equipment, transmitting a sequence of successive command signals over the terminal segment of the subscriber loop prior to the insertion of the power feeding signal; by the access node, accumulating an electrical charge from at least one command signal of the sequence of successive command signals; by the access node and by means of the so accumulated electrical charge, detecting a valid command signal in the sequence of successive command signals, and thereupon configuring the switch in a second switching state wherein the first pair of terminals is connected to a third pair of terminals coupled to a transceiver adapted to operate the new broadband communication service and to a power supply unit adapted to supply power to the access node from the power feeding signal; by the power sourcing equipment, injecting the power feeding signal over the terminal segment of the subscriber loop for reverse power feeding of the access node; and operating the new broadband communication service over the terminal segment of the subscriber loop.

In one embodiment, the command signals are indicative of a preliminary operational state at the power sourcing equipment.

In one embodiment, the command signal is detected as being valid when a payload of the command signal matches a given pattern.

In one embodiment, the at least one legacy communication service comprises at least one of an Asymmetric Digital Subscriber Line ADSL communication service, an Asymmetric Digital Subscriber Line with extended bandwidth ADSL2+ communication service, a Very-high speed Digital Subscriber Line VDSL2 communication service, and a Plain Old Telephony Service POTS.

In one embodiment, the command signals are generated by modulation of at least one AC carriers.

In one embodiment, the at least one AC carriers are situated in a frequency band not currently used by the at least one legacy communication service.

In one embodiment, the frequency band is the voice band of Plain Old Telephony Service POTS.

In accordance with another aspect of the invention, an access node comprises a transceiver adapted to operate a new broadband communication service over a terminal segment of a subscriber loop; a power supply unit adapted to supply power to the access node from a power feeding signal injected by a power sourcing equipment over the terminal segment of the subscriber loop; a switch having a first pair of terminals for coupling to the terminal segment of the subscriber loop, a second pair of terminals for coupling to a further segment of the subscriber loop, and a third pair of terminals coupled to the transceiver and to the power supply unit; and a switch controller adapted to configure the switch in a first switching state wherein the first and second pairs of terminals are connected to each other, or in a second switching state wherein the first and third pairs of terminals are connected to each other. The access node further comprises a power accumulator adapted to accumulate an electrical charge from at least one command signal of a sequence of successive command signals transmitted over the terminal segment of the subscriber loop by the power sourcing equipment while the switch is configured in the first switching state. The access node further comprises a receiver coupled to the power accumulator and adapted to detect a valid command signal in the sequence of successive command signals by means of the so-accumulated electrical charge. The switch controller is coupled to the power accumulator and is further adapted, upon detection of the valid command signal, to configure the switch in the second switching state by means of the so-accumulated electrical charge.

Such an access node typically refers to a DPU, but may alternatively refer to any network equipment providing new broadband communication services to subscribers through a copper plant, and that is remotely fed from the subscriber premises through the same copper plant, such as a remotely deployed Digital Subscriber Line Access Multiplexer (DSLAM) making use of RPF.

In accordance with still another aspect of the invention, a power sourcing equipment comprises a power injector adapted to inject a power feeding signal over a terminal segment of a subscriber loop for reverse power feeding of an access node. The power sourcing equipment further comprises a transmitter adapted to transmit a sequence of successive command signals over the terminal segment of the subscriber loop prior to the insertion of the power feeding signal. The sequence of successive command signals are transmitted for initial and partial reverse power feeding of the access node, and further for connection of the terminal segment of the subscriber loop to a transceiver of the access node adapted to operate a new broadband communication service and to a power supply unit of the access node adapted to supply power to the access node from the power feeding signal.

In one embodiment, the power sourcing equipment is further adapted, after transmission of the sequence of successive command signals, to determine whether a measured DC load impedance of the subscriber loop matches a given signature resistance, to insert the power feeding signal over the subscriber loop if the given signature resistance is successfully detected, else to repeatedly transmit the sequence of successive command signals over the terminal segment of the subscriber loop till the given signature resistance is successfully detected.

Such a power sourcing equipment can be manufactured as a standalone equipment, or can be part of a subscriber device, such as a modem, a router, etc.

In accordance with still another aspect of the invention, a data communication system comprises an access node and a power sourcing equipment as per the present invention.

The present invention proposes a solution to automatically provision new broadband communication services using RPF that is applicable to legacy deployments with or without POTS. This is achieved by the PSE preliminarily sending successive command signals on the copper pair which contains both the required protocol information to initiate RPF operation, as well as enough electrical energy to power a detection module and to switch the bypass relay at the DPU.

The PSE tries first to detect the presence of POTS over the copper pair before initiating RPF operation, e.g. by determining whether there is any DC voltage present over the copper pair. If so, then the PSE sends a sequence of successive command signals over the copper pair to instruct the DPU to switch the bypass relay. The commands signals are designed to have enough RMS power for the DPU to accumulate enough electrical charge in a relatively short amount of time (up to a few tens of seconds) in order to power the basic detection circuitry and the control logic of the bypass switch, yet without impacting POTS legacy communication service by causing an improper OFFHOOK detection at the LEX.

The PSE next determines whether the bypass relay has been properly switched at DPU side by measuring the DC load impedance of the copper pair, and by determining whether the measured impedance matches a given signature resistance. If so, then the PSU is assumed to be correctly connected at the remote end of the copper pair, and the PSE can start injecting the DC power feeding signal for remote power feeding of the DPU as it would no longer conflict with POTS operation.

It is noteworthy that, even if POTS is not present over the copper pair (e.g., xDSL legacy deployments without POTS), the PSU shall mandatorily detect a valid signature resistance on the copper pair and make sure the bypass relay is properly configured at DPU side before injecting the DC power feeding signal.

Preferably, the command signals are generated by modulation of one or more AC carriers situated in a frequency band not currently used by any legacy communication service deployed over the copper pair.

For instance, the command signals can use the POTS voice band, namely [300 Hz; 3400 Hz] frequency range, provided the line is ONHOOK (which is likely to be the case as POTS is being decommissioned for that subscriber). When a voice call is ongoing and an OFFHOOK condition is detected, then the command signals shall not be transmitted.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
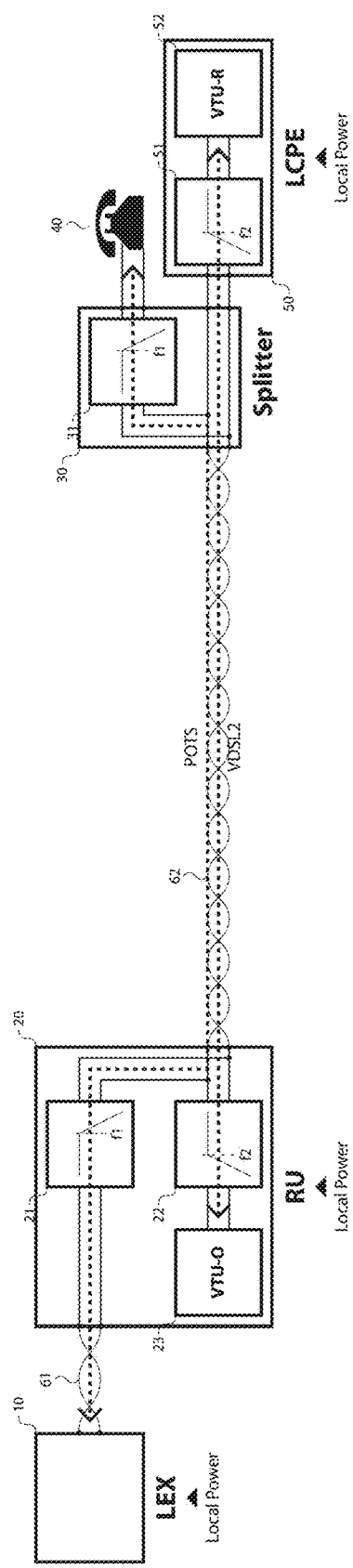
FIG. 1 to 4 represent a communication network that is being upgraded from a legacy communication service to a new broadband communication service.

There is seen in FIG. 1 a legacy communication network comprising the following network elements:
- a LEX 10;
- a RU 20;
- a splitter 30;
- a telephone handset 40; and
- a legacy Customer Premises Equipment (CPE) 50 (or LCPE).

The LEX 10 is coupled to the RU 20 via a first copper pair segment 61, and is for operating POTS.

The RU 20 is for operating a legacy broadband communication service, presently VDSL2 communication service, and is typically situated in a remote street or pole cabinet closer to subscriber premises. The RU 20 is coupled to the splitter 30 through a second (shorter) copper pair segment 62.

The RU 20 accommodates a low-pass filter 21 and a high-pass filter 22 for respectively multiplexing/de-multiplexing the POTS signal and the VDSL2 signal into/from the combined POTS/VDSL2 signal transiting over the second copper pair segment 62. The low-pass filter 21 is coupled to the second copper pair segment 62 and is remotely coupled to the LEX 10 via the first copper pair segment 61. The high-pass filter 22 is coupled to the second copper pair segment 62 and is locally coupled to a VDSL2 transceiver 23 (or VTU-O).

The splitter 30 comprises a low-pass filter 31 coupled to the second copper pair segment 62, and is for multiplexing/de-multiplexing the POTS signal into/from the combined POTS/VDSL2 signal transiting over the second copper pair segment 62. The POTS signals is supplied to the telephone handset 40, while the combined POTS/VDSL2 signal is transparently passed to the legacy CPE 50.

The legacy CPE 50 comprises a high-pass filter 51 coupled to the second copper pair segment 62 for multiplexing/de-multiplexing the VDSL2 signal into/from the combined POTS/VDSL2 signal transiting over the second copper pair segment 62, and a VDSL2 transceiver 52 (or VTU-R) coupled to the high-pass filter 51.

The cut-off frequency f1 of the low-pass filters 21 and 31 is typically about 4 kHz, and the cut-off frequency f2 of the high-pass filters 22 and 51 is typically about 25 kHz.

The VDSL2 transceivers 23 and 52 operate a bi-directional VDSL2 broadband communication channel over the copper pair segment 62. The LEX 10 and the telephone handset 40 operate a bi-directional voice channel via the copper pair segments 61 and 62.

The LEX 10, the RU 20 and the legacy CPE 50 have respective local power supplies available for power feeding, typically 110-240V AC or 48-60V DC.

Figure 2:
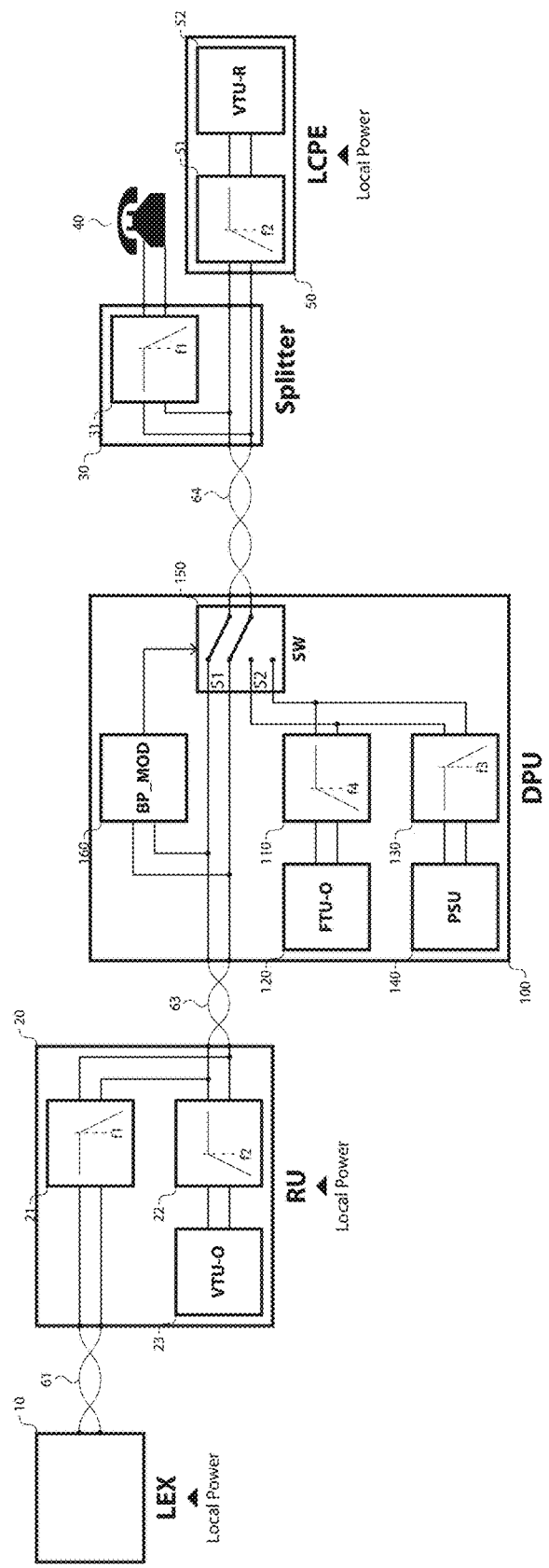

There is seen in FIG. 2 the installation of a new network equipment for upgrading the subscriber base to a new broadband communication service offering higher data rates, presently G.fast communication service.

At some point even closer to the subscriber premises, the copper pair segment 62 is split into two segments 63 and 64 for insertion of a DPU 100. The copper pair segment 64 that connects the DPU 100 down to the subscriber premises is referred to as the terminal segment, while the copper pair segment 63 that connects the DPU 100 up to the RU 20 and further up to the LEX 10 is referred to as the network segment.

The DPU 100 comprises:
- a high-pass filter 110 for multiplexing/de-multiplexing the G.fast signal into/from the combined DC/G.fast signals transiting over the terminal segment 64;
- a G.fast transceiver 120 (or FTU-O);
- a low-pass filter 130 for multiplexing/de-multiplexing the DC power feeding signal into/from the combined DC/G.fast signals transiting over the terminal segment 64;
- a PSU 140 for extracting power from the DC power feeding signals supplied by the various active subscribers and for generating the necessary internal voltage levels for operation of the DPU 100;
- a bypass switch 150 (or SW) with two switching states S1 and S2, such as a latching relay;
- a bypass detection module 160 (or BP_MOD) for controlling the bypass switch 150.

The cut-off frequency f3 of the low-pass filter 130 is typically greater than 4 kHz, and the cut-off frequency of the high-pass filter 110 is typically about 2 MHz.

Initially, the splitter 30 and the legacy CPE 50 are still present at subscriber side. The DPU 100 is thus configured in bypass (or transparent) mode: the bypass switch 150 is configured in the switching state S1 wherein the terminal segment 64 is connected to the network segment 63 so as the DPU 100 is fully transparent to the end-users. The subscribers can keep on using the legacy communication services, such as making voice calls with the handset 40 and connecting to the internet through the legacy CPE 50.

Figure 3:
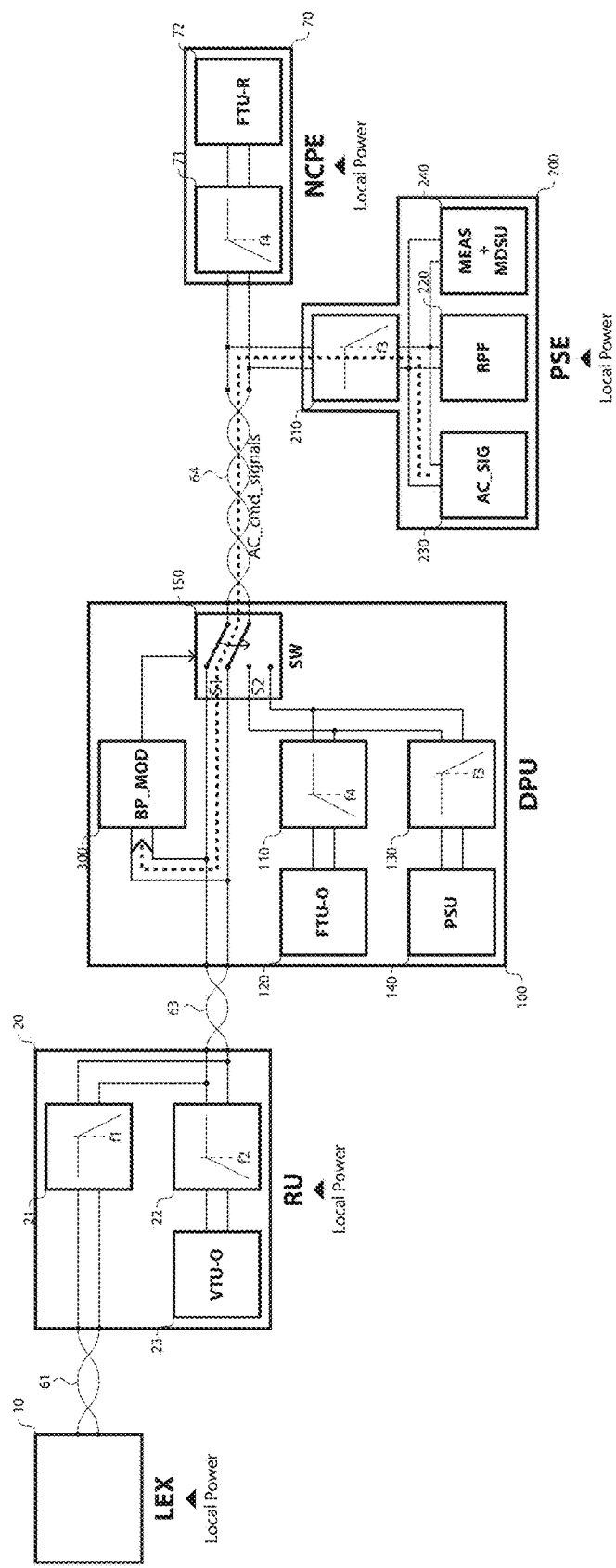

At a latter time, a new CPE 70 (or NCPE) supporting the new G.fast communication service is delivered to the subscriber, together with a PSE 200. The CPE 70 and the PSE 200 can be merged within one single equipment. The legacy network equipment 30, 40 and 50 are decommissioned at subscriber side, and replaced by the newly-supplied network equipment 70 and 200. The new network topology is depicted in FIG. 3.

The new CPE 70 comprises a high-pass filter 71 coupled to the terminal segment 64 for multiplexing/de-multiplexing the G.fast signal into/from the combined DC/G.fast signal transiting over the terminal segment 64, and a G.fast transceiver 72 (or FTU-R) coupled to the high-pass filter 71. The high-pass filter 71 has f4 as cut-off frequency.

The PSE 200 comprises:
a low-pass filter 210,
a power injector 220 (or RPF);
an AC signaling means 230; and
a measurement means 240 (or MEAS+MDSU).

The low-pass filter 210 has f3 as cut-off frequency, and is coupled to the terminal segment 64 in parallel with the new CPE 70. The Low-pass filter 210 is further coupled to the power injector 220, to the AC signaling means 230 and to the measurement means 240.

The power injector 220 is for injecting a DC power feeding signal DC_RPF_signal over the terminal segment 64 for remote power feeding of the DPU 100.

The AC signaling means 230 is for transmitting a sequence of successive AC command signals AC_cmd_signals over the terminal segment 64 for instructing the DPU 100 about the availability of the RPF function at subscriber side, and for requesting the DPU to configure the bypass switch 150 in the switching state S2. In the switching state S2, the terminal segment 64 is connected to the transceiver 120 and to the PSU 140 (i.e., the DPU 100 terminates the terminal segment 64) so as the new G.fast communication service can be operated over the terminal segment 64

The command signals are generated by means of Frequency Shift Keying (FSK) modulation with 1300 Hz and 2100 Hz as reference frequencies. These two frequencies are situated in the POTS voice band, and the PSE 200 has first to make sure that no OFFHOOK condition is active over the copper pair 64 before transmitting such command signals in order not to interrupt an ongoing phone call, such as an emergency call.

The AC signaling means 230 further accommodates a band-pass filter (not shown) to pass frequencies between 1300 Hz and 2100 Hz, and to attenuate frequencies outside this band.

Of course, the command signals can use another modulation scheme, such as BPSK or 4/16 QAM, and other carrier frequencies, such as carrier frequencies situated in the frequency range spanning from the upper bound of the POTS voice band (3400 Hz) up to the lower bound of the VDSL2 frequency band, or carrier frequencies situated below the lower bound of the POTS voice band (below 300 Hz).

Yet, the usage of frequencies in the POTS voice band is beneficial for the hardware implementation. Indeed, the coupling capacitors need to sustain high DC voltages, and using higher frequencies allow smaller value capacitors, which is decreasing the size and cost of the equipment.

The amount of energy that needs to be transferred by means of the command signals AC_cmd_signals is very limited as the power is only needed for two functions, namely to decode one of the command signals AC_cmd_signals transmitted by the PSE 200 over the terminal segment 64, and to provide the necessary current to switch the bypass switch 150 into the switching state S2.

The RMS voltage of the command signals AC_cmd_signals should however be low enough in order to not trip the safety protection in the LEX 10. Assuming an input impedance of 900Ω for the POTS line and neglecting the loop insertion loss, we can apply $27V_{RMS}$ between the tip and ring of the copper pair (or $38V_p$ or $76V_{pp}$) to keep the RMS current below 30 mA for instance. This is sufficient to charge a capacitor in a reasonable amount of time.

The measurement means 240 is for measuring the DC voltage present between the tip and ring of the copper pair 64, and for measuring the DC impedance loading the copper pair 64 following the so-called Metallic Detection Start-Up (MDSU) procedure;

The MDSU requires the injection of one or more intermediary DC voltages over the copper pair 64, and next the measurement of the corresponding DC load impedance in order to detect a particular signature resistance indicative of a PSU being remotely connected to the copper pair 64.

Once the MDSU test is successful, the PSE 200 can start with standardized RPF start-up protocol, e.g. as described in ETSI 101548v010101.

Figure 4:
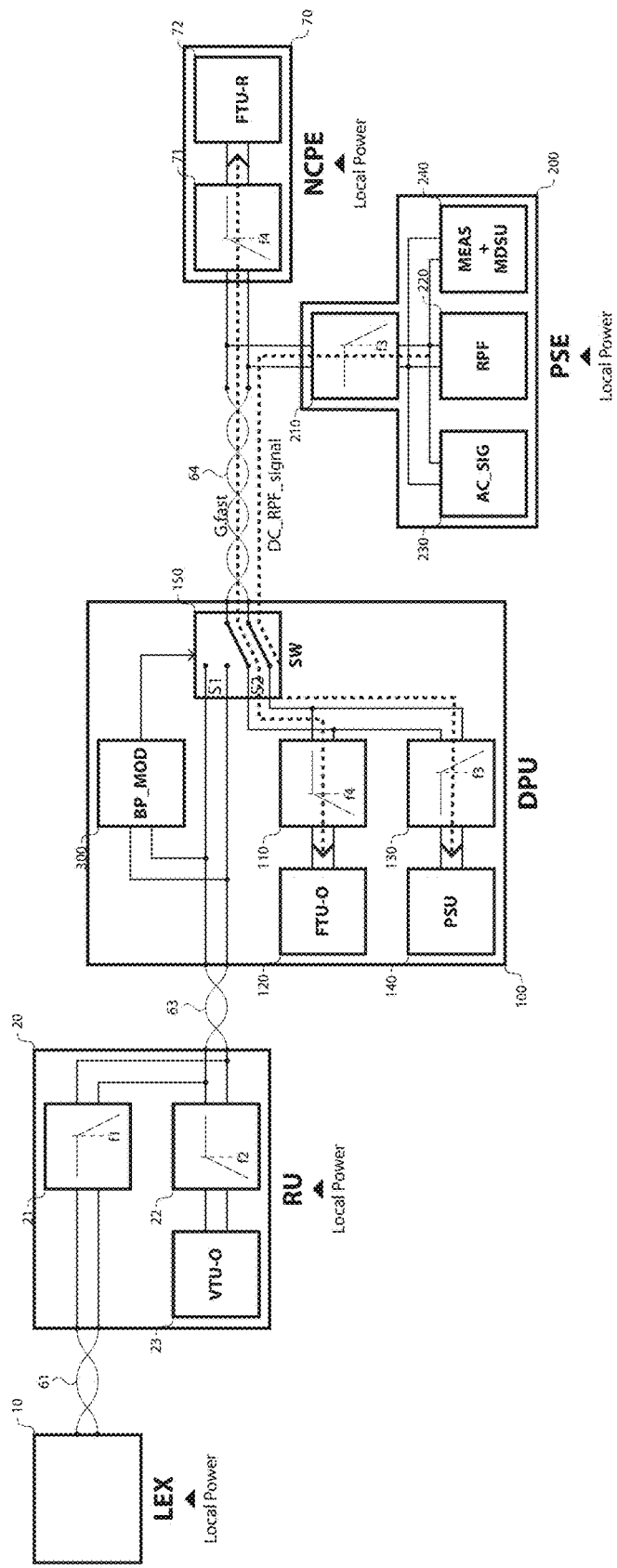

This last step is depicted in FIG. 4, wherein a DC power feeding signal DC_RPF_signal is inserted over the terminal segment 64 by the PSE 200. The DC_RPF_signal is used by the PSU 140 (possibly with other DC power feeding signals from other subscribers) for generation of the necessary internal DC voltages (e.g., 12V, 5V and 3V3). These voltages are then distributed to the respective active circuits of the DPU 100 for normal operation of the DPU 100. Thereupon, a G.fast bi-directional communication channel can be established between the transceivers 120 and 72 over the terminal segment 64.

Figure 5:
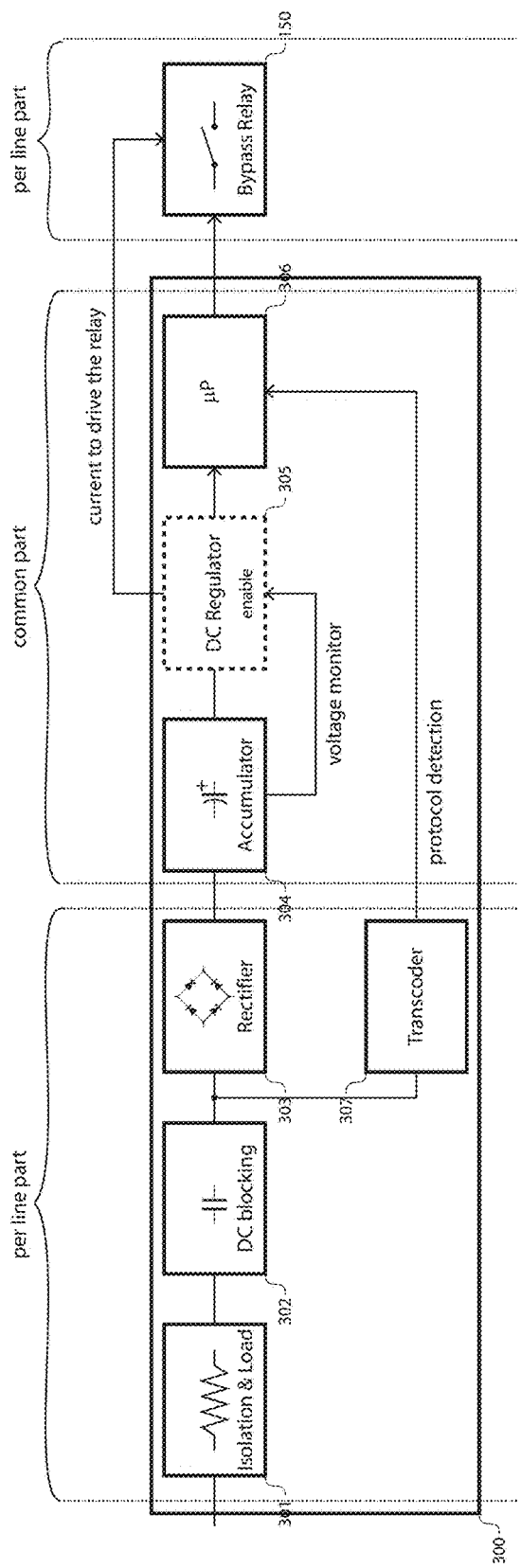
FIGS. 5 and 6 represent further details about a bypass detection module in an access node.
Figure 6:
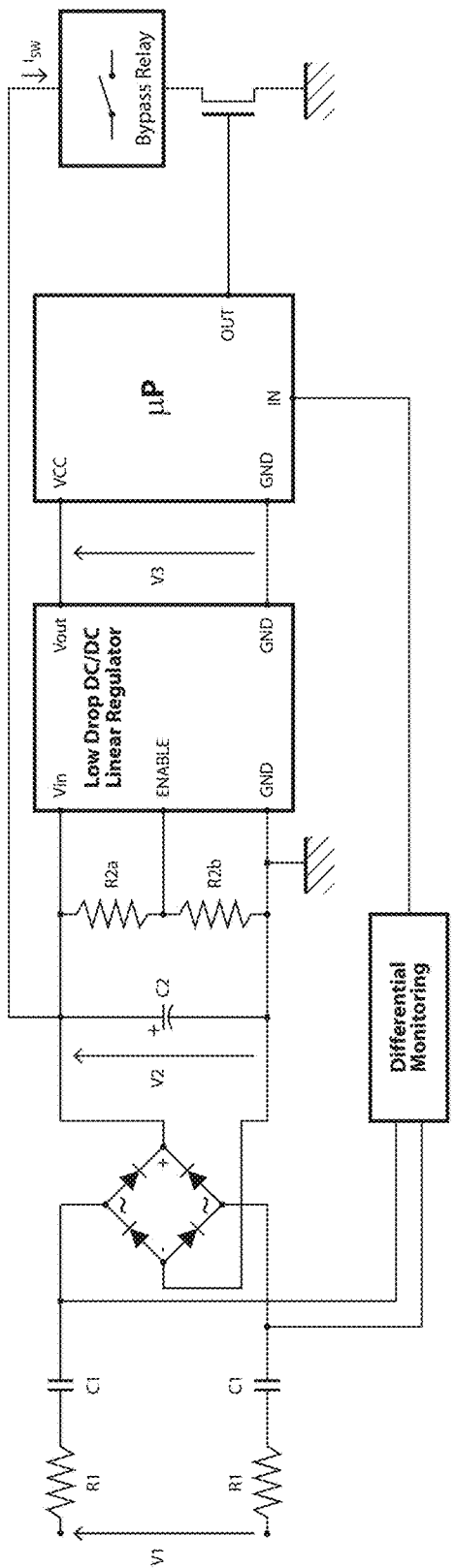

Further details about the bypass detection module 300 are depicted in FIGS. 5 and 6.

The bypass detection module 300 consists of a number of different hardware blocks serially coupled to each other, namely:
an isolation and load circuit 301,
a DC blocking circuit 302;
a rectifier 303;
a power accumulator 304;
a DC regulator 305; and
a microcontroller (or microprocessor) 306.

An output of the microcontroller 306 is coupled to a control input of a latching relay 150, which keeps its prior switching state when unpowered.

The bypass detection module 300 further comprises a transcoder 307 for converting the AC differential signal at the output of the DC blocking circuit 302 into a single-wire signal fed to an input of the microcontroller 306 for protocol detection. The transcoder 307 may further include a demodulator for demodulating the AC command signals AC_cmd_signals into a baseband signal.

The isolation and load circuit 301 together with the DC blocking circuit 302 form the isolation part. This part is in direct contact with the copper pair. In order to limit the impact on POTS and xDSL legacy services, it is required to have a high input impedance. This is accomplished with two isolation resistors R1 serially coupled to the copper pair, typically in the order of 8 kΩ per wire (which is also sufficient to not load the copper pair for xDSL frequencies).

The DC blocking circuit 302 typically comprises two capacitors C1 serially coupled to the resistors R1, and provides isolation from the POTS DC voltage which might be present on the copper pair.

The values of R1 and C1 shall be selected carefully as this impacts the charge time of the charge capacitor C2.

The rectifier 303 and the power accumulator 304 forms the energy storage part. A full wave rectifier bridge rectifies the negative swings of the AC command signals AC_cmd_signals. A full wave rectifier is required as the polarity is unknown prior to installation. The output of the bridge rectifier is connected to a charge capacitor C2. An increasing DC voltage V2 thus develops across the charge capacitor C2 while the AC command signals AC_cmd_signals are being received from the PSE 200.

The DC regulator 305, the microcontroller 306 and the bypass switch 150 form the load part. A low-drop linear regulator converts the voltage across the charge capacitor C2 to a lower voltage to power the microcontroller. A low-drop linear regulator is preferred over a switched-mode regulator to avoid costly and bulky inductors. Due to the small current (<1 mA typically for low-power controller), power losses in the low-drop linear regulator can be minimized. Once powered, the microcontroller starts decoding one or more of the AC command signals AC_cmd_signals transcoded by the differential monitoring block. When a valid pattern is detected, the microcontroller will steer the bypass relays to connect the user to a G.fast transceiver and a PSU. The energy needed to drive the bypass relay is directly taken from the charged capacitor C2.

Size and cost are very important for DPU's. As indicated on FIG. 5, the bypass relay, the isolation part, the rectifier and the transcoder are required per line, but the charge capacitor, the DC regulator and the microcontroller can be shared over multiple subscriber line ports of multi-port DPU units.

The DC regulator 305 is an optional block as the required energy can directly be drained from the power accumulator 304. This configuration is possible when the microcontroller 306 can tolerate a large power supply range (e.g., 1.8V-5.5V). Such devices are commercially available. Avoiding the low-drop linear regulator results in an additional cost saving.

Figure 7A:
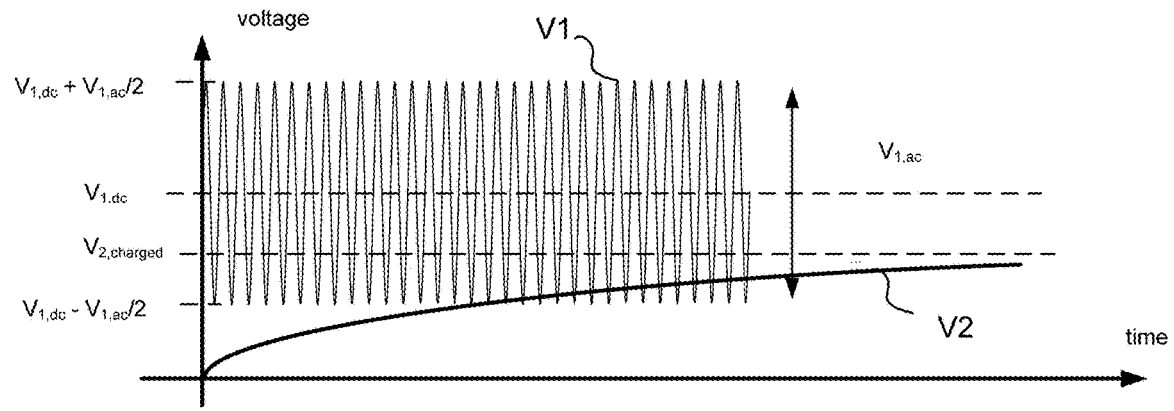
FIGS. 7A, 7B and 7C represent various voltage/current plots versus time within the bypass detection module.

FIG. 7A represents a time plot of the voltage V1 at the input of the bypass detection module 300 and of the voltage V2 that develops across the charge capacitor C2.

The PSE 200 sends successive AC command signals AC_cmd_signals on the copper pair 64, which results in a given signal with amplitude $V_{1,ac}$ which is superponated on a DC POTS voltage $V_{1,dc}$ if any (for convenience, the AC command signals are plotted unmodulated).

The AC signal which is presented at the input of the full wave rectifier bridge allows to store a DC voltage across the charge capacitor C2. After a given amount of time, the capacitor C2 is charged to a voltage $V_{2,charged}$. As long as the low-drop linear regulator is not started, no current is taken from the charge capacitor C2 (except some leakage current), hence the capacitor voltage V2 can increase in time.

When the voltage V2 is equal to a predefined level, the low-drop linear DC/DC regulator is enabled through the voltage divider R2a and R2B (see FIG. 6). The low-drop linear regulator converts the voltage V2 across the capacitor C2 to a lower voltage V3, which powers the microcontroller. A hysteresis in the low-drop linear regulator is required to still enable the output while the capacitor C2 is discharging.

Figure 7B:
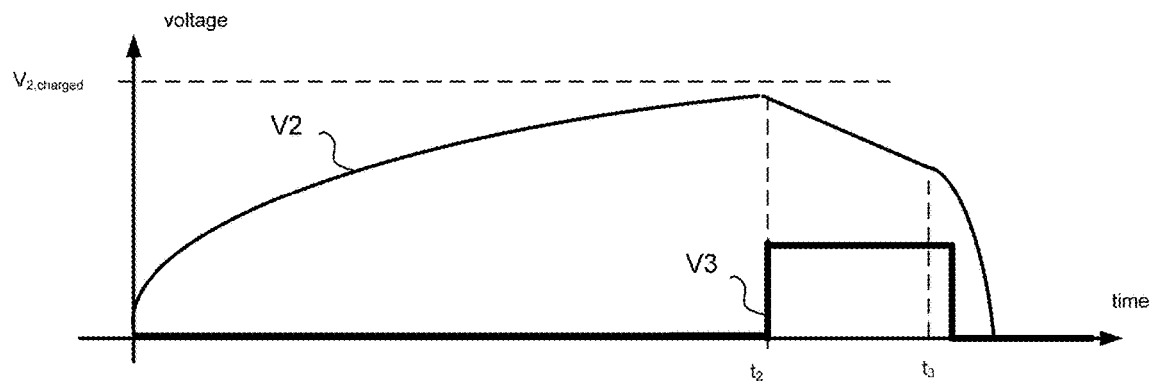

FIG. 7B shows V2 and V3 voltages versus time. The voltage V2 over C2 starts increasing up to time $t_2$, when the low-drop regulator is enabled. From that time onwards, a lower voltage V3 is generated at the output of the low-drop linear regulator, which feeds the low-power microcontroller. Due to the current taken from the microcontroller and the low-drop linear regulator, the voltage V2 across C2 starts decreasing.

Once powered, the microcontroller starts to decode the AC signal which is sensed before the rectifier bridge and transcoded by the differential monitoring block to decode the protocol information transmitted by the PSE. The protocol information modulated on the respective AC carriers may be very basic, such as the presence of one or more HDLC flags, or may comprises some further information elements, as well as some parity check.

When the microprocessor detects a valid code, the gate of the MOSFET transistor is enabled: a current $I_{SW}$ flow through the bypass relay, and its switching state is changed from S1 to S2. The current to drive the bypass relay (which is typically a loading coil) is directly delivered from the charge capacitor C2. Other means to drive and feed the bypass relay are also possible, such as a thyristor, a low-voltage relay, etc.

Figure 7C:
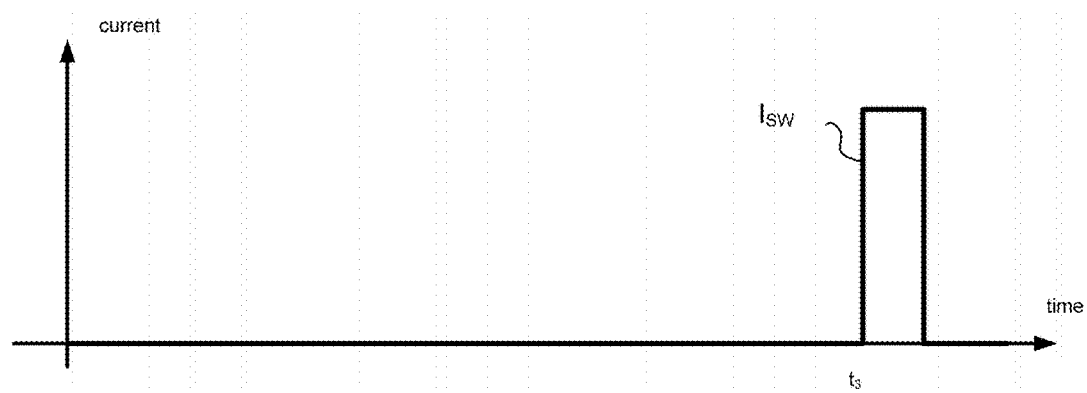

This is depicted in FIGS. 7B and 7C. After time $t_2$, the microcontroller starts to decode the AC signal before the rectifier bridge. At time $t_3$ a valid code is detected, and the relay control signal is toggled to switch the bypass relay into the switching state S2. From time $t_3$, additional current $I_{SW}$ is taken to drive the bypass relay. The current $I_{SW}$ is directly delivered by the charge capacitor C2, hence V2 is reducing faster after t3. If C2 is discharged below the point where the low-drop linear regulator is no longer enabled and if no valid code has been detected so far, then the microcontroller shuts down and the process restarts autonomously some time later after the capacitor C2 is charged again.

Additional components for lightning protection and protection for ringing voltages should typically be added. These are orthogonal to the invention and should be part of design process.

It is noteworthy that the charge capacitor C2 is also charged when ringing voltage is applied on the line. The microcontroller will start to decode the (ringing) signal, but since no valid code is detected, the bypass relays is not switched.

The bypass detection module 300 is connected between the bypass switch 150 and the network segment 63. The POTS bypass detection module is no longer attached to the copper line once the bypass relay 150 is switched to the switching state S2. This adds the advantage that the bypass detection module 300 can be made transparent up to 17 MHz or 30 MHz (for VDSL2), and not up to 106 MHz or 212 MHz (for G.fast) since it will never be connected to copper pairs over which G.fast communication services are operated.

An alternative implementations is possible, wherein the bypass detection module 300 is connected between the bypass switch 150 and the terminal segment 64. The advantage of this second implementation is that the detection circuit could also be used for upstream communication between the PSE 200 and the DPU 100, for instance to share battery status, serial number, power capabilities, and so forth.

Figure 8:
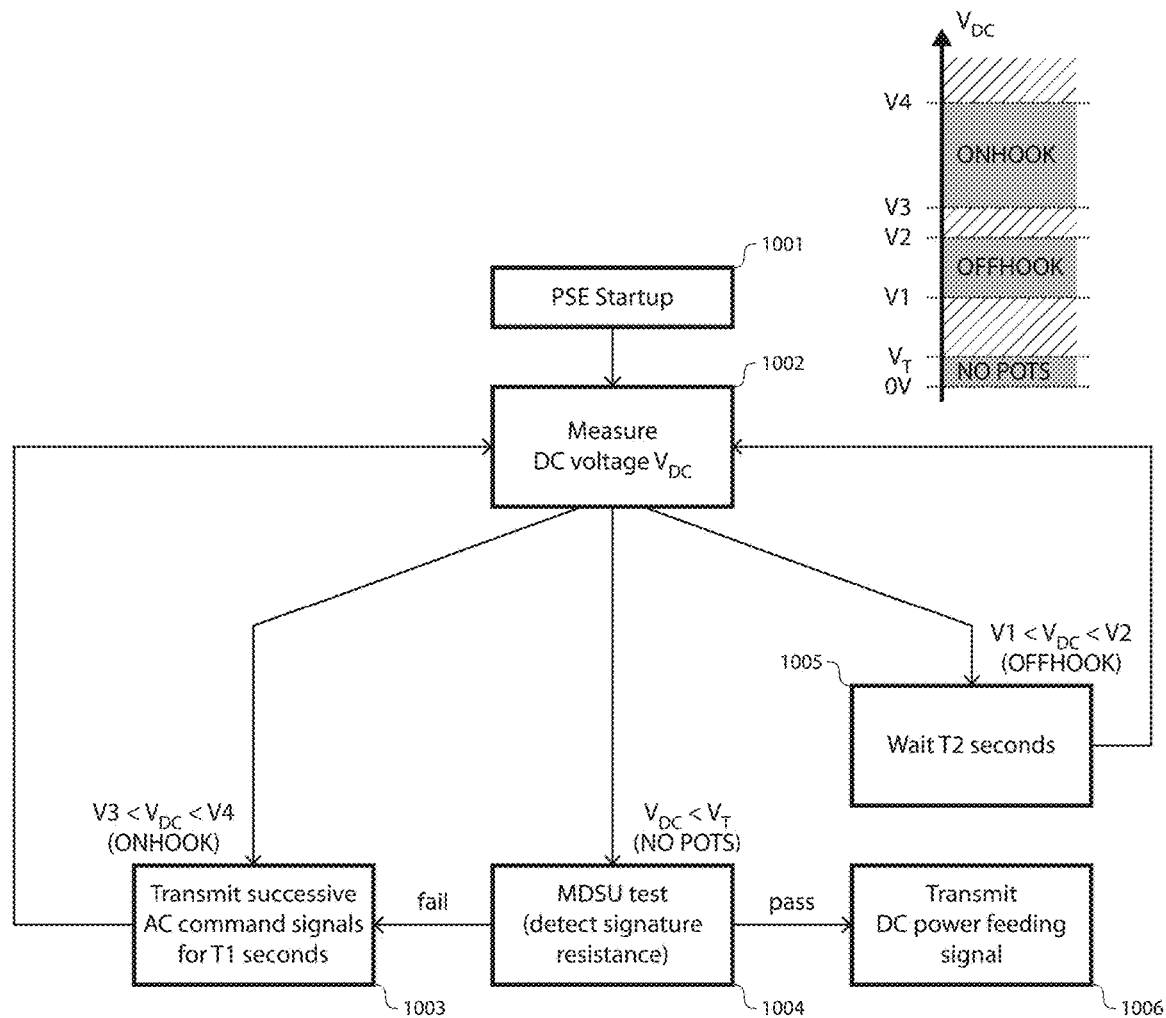
FIG. 8 represents a state diagram for PSE operation.

There is seen in FIG. 8 a state diagram for PSE operation.

As a matter of introduction, different voltage thresholds VT, V1, V2, V3 and V4 have been plotted on a vertical axis with VT<V1<V2<V3<V4. These voltage thresholds are used for assessing the POTS operational status of a subscriber line.

Let $V_{DC}$ denote the DC voltage as measured by the PSE 200 between the tip and ring of the copper pair 64. If $V3 \leq V_{DC} \leq V4$ then POTS service is assumed to be operational over the line and the line is assumed to be in the ONHOOK state, meaning no voice call is being made. If $V1 \leq V_{DC} \leq V2$ then POTS service is assumed to be operational over the line and the line is assumed to be in the OFFHOOK state, meaning a voice call is ongoing over the line (such a situation barely occurs as the handset 40 is expected to be decommissioned at subscriber side when connecting the PSE 200). Finally, if $V_{DC} \leq VT$ then POTS service is assumed to be no longer operational over the line. This does not necessarily mean that the bypass switch is already in the right position and that the DPU is ready to operate the new broadband communication service over the line. Indeed, a legacy xDSL communication service may have been deployed over that line without POTS, and the bypass switch is still to be properly configured for that line.

Let us set forth now the steps through which the PSE 200 goes through when starting up.

In step 1001, the PSE 200 starts up and run through some builtin tests to make sure it is ready for operation.

In step 1002, the DC voltage between the tip and the ring of the copper pair 64 is measured by the measurement means 240, thereby yielding a measured voltage value $V_{DC}$.

If the measured DC voltage $V_{DC}$ is between V3 and V4, then POTS service is operational and the line is in the ONHOOK state. The PSE 200 goes to step 1003 and the AC signaling means 230 transmits a sequence of successive AC commands signals over the copper pair 64 for T1 seconds in order to force the by-pass switch at the DPU side to the switching state S2. After T1 seconds, the PSE 200 returns to step 1002, and measures the DC voltage again.

If the measured DC voltage $V_{DC}$ is between V1 and V2, then POTS service is operational and the line is in OFF-HOOK state. The PSE 200 cannot transmit the AC command signals as this would conflict with an on-going voice call (only in case the AC signals use the POTS voice band). The PSE 200 thus transitions to step 1005, waits for T2 seconds, and next returns to step 1002 for a new measurement round.

The branch 1002→1005→1002 can also be used if the measured DC voltage $V_{DC}$ is outside the allowed voltage ranges (see hatched areas in FIG. 8). Such a situation is not expected to occur, and rather is indicative of a network failure that needs to be first identified and repaired.

Finally, if the measured DC voltage $V_{DC}$ is below a given threshold $V_T$, then POTS service is no longer operational over the line. The PSE 200 goes to step 1004, and the measurement means 240 performs a MDSU test over the copper pair 64. Successive intermediary voltage levels are applied to the copper pair 64, and the DC load impedance of the copper pair 64 is measured for detection of a particular signature resistance. If a signature resistance is successfully detected over the copper pair 64, meaning the bypass switch at DPU side is in the switching state S2 and a PSU is connected to the remote end of the copper pair 64, the MDSU test passes (see "pass" branch in FIG. 8), and the PSE 200 can transition to final step 1006. The power injector 220 injects a DC power feeding signal over the copper pair 64 for remote power feeding of the DPU. Else, if the PSE 200 fails to detect the signature resistance over the copper pair, then the MDSU test fails (see "fail" branch in FIG. 8), and the PSE 200 transitions to step 1003 for transmitting a sequence of AC command signals for T1 seconds over the copper pair 64. Thereafter, the PSE 200 returns to step 1003, and so forth.

Of course, other voltage thresholds can be used to determine the POTS operational status. For instance, the voltage thresholds V2 and V3 can be merged into one single threshold, and/or so can be the thresholds $V_T$ and V1. The upper bound voltage threshold V4 can be similarly ignored. In this case, if the measured DC voltage is below $V_T$=V1, then POTS is no longer operational. If the measured DC voltage is between $V_T$=V1 and V2=V3, then POTS is operational yet the line is OFFHOOK. And last, if the measured DC voltage is above V2=V3, then POTS is operational and the line is ONHOOK.

Although the above description was primarily concerned with upgrading a data communication system from VDSL2 (with or without POTS) to G.fast, it similarly applies to ADSL or ADSL2+ deployments (with or without POTS) wherein the DSLAM is co-located with the LEX at the CO. The copper pair segment 61 then corresponds to a local connection between the LEX and the CO, typically via a Main Distribution Frame (MDF), and the copper pair segment 62 corresponds to the main subscriber loop spanning from the CO down to the subscriber premises. This subscriber loop is then split into two segments (as per the segments 63 and 64) for insertion of a DPU and G.fast service upgrade as per the present invention.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, Digital Signal Processor (DSP) hardware, network processor, Application Specific Integrated circuit (ASIC), Field Programmable Gate Array (FPGA), etc. Other hardware, conventional and/or custom, such as Read Only Memory (ROM), Random Access Memory (RAM), and non volatile storage, may also be included.

The invention claimed is:

1. A method for provisioning a new broadband communication service, and comprising:

inserting an access node adapted to operate the new broadband communication service along a subscriber loop;

configuring a switch of the access node in a first initial switching state wherein a first pair of terminals coupled to a legacy subscriber device via a terminal segment of the subscriber loop is connected to a second pair of terminals coupled to a legacy network equipment via a further segment of the subscriber loop;

operating at least one legacy communication service over the subscriber loop while the switch is in the first switching state;

connecting a power sourcing equipment adapted to inject a power feeding signal for reverse power feeding of the access node and a new subscriber device adapted to operate the new broadband communication service to the terminal segment of the subscriber loop, wherein the method further comprises:

by the power sourcing equipment, transmitting a sequence of successive command signals over the terminal segment of the subscriber loop prior to the insertion of the power feeding signal;

by the access node, accumulating an electrical charge from at least one command signal of the sequence of successive command signals;

by the access node and by means of the so accumulated electrical charge, detecting a valid command signal in the sequence of successive command signals, and thereupon configuring the switch in a second switching state wherein the first pair of terminals is connected to a third pair of terminals coupled to a transceiver adapted to operate the new broadband communication service and to a power supply unit adapted to supply power to the access node from the power feeding signal;

by the power sourcing equipment, injecting the power feeding signal over the terminal segment of the subscriber loop for reverse power feeding of the access node; and operating the new broadband communication service over the terminal segment of the subscriber loop.

2. A method according to claim 1, wherein the command signals are indicative of a preliminary operational state at the power sourcing equipment.

3. A method according to claim 1, wherein the command signal is detected as being valid when a payload of the command signal matches a given pattern.

4. A method according to claim 1, wherein the at least one legacy communication service comprises at least one of an Asymmetric Digital Subscriber Line ADSL communication service, an Asymmetric Digital Subscriber Line with extended bandwidth ADSL2+ communication service, a Very-high speed Digital Subscriber Line VDSL2 communication service, and a Plain Old Telephony Service POTS.

5. A method according to claim 1, wherein the command signals are generated by modulation of at least one AC carriers.

6. A method according to claim 5, wherein the at least one AC carriers are situated in a frequency band not currently used by the at least one legacy communication service.

7. A method according to claim 6, wherein the frequency band is the voice band of Plain Old Telephony Service POTS.

8. An access node comprising:

a transceiver adapted to operate a new broadband communication service over a terminal segment of a subscriber loop;

a power supply unit adapted to supply power to the access node from a power feeding signal injected by a power sourcing equipment over the terminal segment of the subscriber loop;

a switch having a first pair of terminals for coupling to the terminal segment of the subscriber loop, a second pair of terminals for coupling to a further segment of the subscriber loop, and a third pair of terminals coupled to the transceiver and to the power supply unit;

a switch controller adapted to configure the switch in a first switching state wherein the first and second pairs of terminals are connected to each other, or in a second switching state wherein the first and third pairs of terminals are connected to each other, wherein the access node further comprises a power accumulator adapted to accumulate an electrical charge from at least one command signal of a sequence of successive command signals transmitted over the terminal segment of the subscriber loop by the power sourcing equipment while the switch is configured in the first switching state, wherein the access node further comprises a receiver coupled to the power accumulator and adapted to detect a valid command signal in the sequence of successive command signals by means of the so-accumulated electrical charge, and wherein the switch controller is coupled to the power accumulator and is further adapted, upon detection of the valid command signal, to configure the switch in the second switching state by means of the so-accumulated electrical charge.

9. An access node according to claim 8, wherein the access node is a Distribution Point Unit DPU.

10. An access node according to claim 8, wherein the access node is a remotely deployed Digital Subscriber Line Access Multiplexer DSLAM making use of remote power feeding.

11. A power sourcing equipment comprising:

a power injector adapted to inject a power feeding signal over a terminal segment of a subscriber loop for reverse power feeding of an access node, wherein the access node is located between the power sourcing equipment and a service provider on the subscriber loop; and a transmitter adapted to transmit a sequence of successive command signals over the terminal segment of the subscriber loop prior to the insertion of the power feeding signal, wherein the sequence of successive command signals are transmitted for initial and partial reverse power feeding of the access node, and further for connection of the terminal segment of the subscriber loop to a transceiver of the access node adapted to operate a new broadband communication service, and to a power supply unit of the access node adapted to supply power to the access node from the power feeding signal.

12. A power sourcing equipment according to claim 11, wherein the power sourcing equipment is further adapted, after transmission of the sequence of successive command signals, to determine whether a measured DC load impedance of the subscriber loop matches a given signature resistance, to insert the power feeding signal over the subscriber loop if the given signature resistance is successfully detected, else to repeatedly transmit the sequence of successive command signals over the terminal segment of the subscriber loop till the given signature resistance is successfully detected.

13. A subscriber device comprising:
a power sourcing equipment including,
- a power injector adapted to inject a power feeding signal over a terminal segment of a subscriber loop for reverse power feeding of an access node, wherein the access node is located between the power sourcing equipment and a service provider on the subscriber loop, and
- a transmitter adapted to transmit a sequence of successive command signals over the terminal segment of the subscriber loop prior to the insertion of the power feeding signal, wherein
- the sequence of successive command signals are transmitted for initial and partial reverse power feeding of the access node, and further for connection of the terminal segment of the subscriber loop to
    - a transceiver of the access node adapted to operate a new broadband communication service, and to
    - a power supply unit of the access node adapted to supply power to the access node from the power feeding signal.

\* \* \* \* \*